United States Patent [19]

Gunnarsson

[11] Patent Number: 5,552,790
[45] Date of Patent: Sep. 3, 1996

[54] DEVICE FOR WIRELESS TRANSFER OF INFORMATION

[75] Inventor: Staffan Gunnarsson, Vallingby, Sweden

[73] Assignee: Saab-Scania Combitech Aktiebolag, Jonkoping, Sweden

[21] Appl. No.: 256,791

[22] PCT Filed: Jan. 21, 1993

[86] PCT No.: PCT/SE93/00031

§ 371 Date: Oct. 19, 1994

§ 102(e) Date: Oct. 19, 1994

[87] PCT Pub. No.: WO93/15418

PCT Pub. Date: Aug. 5, 1993

[30] Foreign Application Priority Data

| Jan. 23, 1992 | [SE] | Sweden | 9200209 |
| Jan. 23, 1992 | [SE] | Sweden | 9200210 |
| May 11, 1992 | [SE] | Sweden | 9201475 |
| Jun. 17, 1992 | [SE] | Sweden | 9201864 |
| Nov. 30, 1992 | [SE] | Sweden | 9203590 |

[51] Int. Cl.$^6$ .............................. G01S 13/74; H04B 1/59
[52] U.S. Cl. ........................................ 342/51; 342/42
[58] Field of Search .......................... 342/42, 44, 51; 343/700 MS; 340/825.69, 825.72

[56] References Cited

U.S. PATENT DOCUMENTS

| 4,068,232 | 1/1978 | Meyers et al. ............... 342/42 |
| 4,612,719 | 9/1986 | De Jong .................... 119/106 |
| 4,816,839 | 3/1989 | Landt ....................... 343/795 |
| 4,987,421 | 1/1991 | Sunahara et al. ........ 343/700 MS |

FOREIGN PATENT DOCUMENTS

| 2624677 | 6/1989 | European Pat. Off. . |
| 0467036 | 1/1992 | European Pat. Off. . |
| 63-292734 | 11/1988 | Japan . |
| 465391 | 9/1991 | Sweden . |
| 9201953 | 2/1992 | WIPO . |

OTHER PUBLICATIONS

Kamata et al, "AVI Transponder", Electrocomponent Science and Tech., vol. 8, 1981, pp. 137–144.

*Primary Examiner*—Ian J. Lobo
*Attorney, Agent, or Firm*—Lowe, Price, LeBlanc & Becker

[57] ABSTRACT

A device for wireless transfer of information includes a data carrier in the form of a thin card, and a transponder that receives a first microwave signal, modulates it and codes it with data, and reradiates a second microwave signal without adding new energy thereto. The transponder includes at least one antenna device formed using microstrip conductors. The antenna device includes a patch antenna with an antenna layer that acts against a ground plane where the antenna layer and the ground plane are of substantially equal size. The device is characterized in that, it is equipped with a separate card holder with a reflective surface that is larger than said ground plane. The reflective surface increases the range by reradiating the second microwave signal and reducing sensitivity to back lobe reflections.

20 Claims, 5 Drawing Sheets

DEVICE FOR WIRELESS TRANSFER OF INFORMATION

The present invention relates to a device for wireless transfer of information, and comprises a data carrier in the form of a transponder that is configured as a thin card. It can receive a first microwave signal, modulate it and code it with data to obtain a second microwave signal that is reflected and reradiated without adding new energy. Reception and reradiation takes place via a micro strip patch antenna in the card, where the ground plane's surface is of principally equal size as the antenna surface, thereby forming an antenna diagram that makes it possible to communicate the card from either side.

The invention also relates to a card holder comprising a reflective material with a surface size that is larger than the ground plane/antenna surface of the card, thereby giving the aforementioned card an increased directivity to obtain a long communication range and to make it insensitive to uncontrolled back lobe signal reflections.

The invention is in particular intended to be carried by a person to obtain automatic identification and data communication, but can also be used in other ways. One such application is when the card holder is attached to the inside of a vehicle's window to use the card also for automatic debiting of road tolls, parking fees et cetera. The device can also be used for debiting in relation to automatic fuelling of vehicles.

BACKGROUND OF THE INVENTION

As is generally known, microwave technology provides a potential for comparatively long wireless communication range as compared to other technologies like magnetic cards, bar coded cards, inductive cards and medium wave cards.

A number of microwave transponders are known that have a directed lobe diagram, i e with a sensitivity that is high on one side while the other side has a low sensitivity. To communicate these transponders, it is thus necessary to orient them with the sensitive side towards their read- or read/write equipment, hereafter called interrogator, to obtain a secure and long range communication.

Especially concerning personal identification and data communication, it would be convenient if it wasn't necessary to orient the card with a special side towards the interrogator's antenna. This is especially true in cases when the card is hand carried such as at a time recording terminal, a teller machine or paying automate. Ultimately, no special education of the user would be necessary if the only orientation requirement for secure communication is that the transponder is held close to the interrogator's antenna.

At the same time, it would be desirable if the transponder could be made to function securely also when it, e.g. in the form of an identification card, is carried close to the human body, such as in a card holder. The requirement for long communication distance is extra pronounced when the card this way for instance is carried fixed to the front pocket of a jacked or to the waist band of a skirt, since the interrogator's antenna may at the same time be situated above a door or under a ceiling.

Different solutions to the problem of transferring information between an interrogator and a card transponder, no matter of which side of the transponder that faces the interrogator's antenna, have been presented in patent applications EP 8900147-9 and JP 63-292734.

The former describes a transponder with a dipole antenna that has equal sensitivity from front and back. A major disadvantage with this solution is however that it cannot be located close to a reflecting surface such as the human body or a card holder in a reflective material, since microwave signals are then cancelled out by reasons that are described in the literature about dipole antennas close to a ground plane.

The latter application describes a solution with separate antennas for reception and reradiation, at both sides of the card, i e in total using up to four antennas. This solution is comparatively size consuming and also expensive to implement in a product.

The objective and most important characteristics of the invention

The objective of the invention is to provide a card shaped data carrier as mentioned in the beginning of this text, that doesn't show the limitations that are common in present solutions, and that can receive and reradiate microwave signals at either side of the card when placed in free space, or alternatively, receive and reradiate microwave signals with extra good range performance if placed close to a reflecting surface such as a reflective card holder or the human body.

In a preferred embodiment, the device can be integrated with a card according to ISO standards for magnetic cards,.

According to the invention, the device is primarily characterised by that the antenna has the form of a patch antenna, with an antenna layer acting against a ground plane, where the antenna layer and the ground plane have essentially the same size.

Usually patch antennas in data carrier transponders are made with a ground plane of much larger size than the antenna surface in order to avoid that a so called back lobe causes interference between the directly radiated signal and a signal reflected in objects behind the transponder.

In the present invention the intention is however the opposite, i e to create a radiation diagram where the back lobe and the front lobe have equal sizes as in a dipole transponder, thereby lessening the orientation requirement when the transponder card is presented at an interrogator's antenna.

Opposite to the dipole transponder however, a card according to the invention can also be mounted directly or close to a reflective surface by it's use of patch antenna technique, since the phase of the backwards radiated signal is such that it brings the reflected signal to cooperate with the direct signal instead of cancelling it out as is the case in a dipole antenna card transponder.

The only known dipole antenna that can be placed close to a reflective plane is the microstrip dipole, but this type of antenna has a lower efficiency than that of the patch antenna according to the invention, and is therefore not considered as part of the present invention.

Furthermore, the chosen patch antenna type is much more narrowband than a dipole antenna, with a bandwidth typically in the order of 1%. Especially if the dielectric substrate between the antenna surface and the groundplane is made thin, as in the credit card implementation, this narrow bandwidth is automatically achieved. The card transponder will thus only be sensitive to the intended radiation field from the interrogator and not to interfering frequencies from other signal sources. The card can for instance be designed to operate selectively in the ISM band at 2.45 GHz or in the RTI band at 5.8 GHz, with typical bandwidths in the order of 25 to 50 MHz.

When operating at higher frequencies it is possible to integrate more than one patch antenna in the card due to their smaller size, especially if a high dielectric constant microwave substrate is used. These patch antennas will then each have a ground plane that is of similar size as the corresponding antenna surface. For reflection, they can however use common surface that covers the reflections from several patch antennas in the card.

The space between antenna surface and ground plane can be filled with air, but in a preferred embodiment it is suitable to use a dielectric substrate, that however not necessarily is the same as the carrier material of the card body. The dielectric material should preferably have a low relative dielectric constant, e g lower than 5, to make the resonant antenna surface as large as possible. A large resonant antenna gives excellent sensitivity to incoming microwave fields, thus increasing the read/write range of the card.

In one embodiment according to the invention, the antenna surface is located with a wide space margin along the card edges to give room for a user's grip area, in order to avoid the user's fingers from covering the antenna surface more than necessary.

In order to save space, the antenna surface can be given an opening for microstrip conductors and discrete components such as microwave detection/modulation-, memory- and low frequency oscillator circuits. This furthermore increases the available grip space, and gives room for a larger antenna in the card.

Using microstrip conductors that are located within the inner circumference of the antenna surface and that acts against the same ground plane as the antenna surface, saves cost in that less antenna substrate material is needed, and in that no electrical feed through holes are necessary.

A part of the invention is the earlier mentioned card holder, that provides a reflection plane for the unit to increase it's range and to eliminate any sensitivity to undesired back lobe reflections.

The reflective plane can be realised in different ways, either in that the holder is made essentially in a metallic material or in that it is made in a non metallic material, typically a plastic, where the reflection plane can be in the form of a metal foil, a surface metallization or metal wires that are moulded into the material.

Of special importance is that the reflective surface is wider than that of the antenna/ground plane surface, especially in the orientation along the polarisation E-plane. This is because of that the major part of the radiation takes place at the edges of the patch that are in line with it's E-vector and where the largest field strength is built up. Along the H-vector edges of the patch, where the major part of the microwave current flows, a large reflection plane is less important. It is however no disadvantage if the reflective plane also in the H-vector direction is wider than the patch antenna/ground plane.

The reflective card holder can be equipped with a clip to make it convenient to carry, e g in the front pocket of a jacket or in the waist band of a skirt, to clearly display the card to the interrogator, but also to other people. This is a special benefit if the card is equipped with characteristic marking, photograph etc. related to it's use.

The holder also provides mechanical protection for the card, which is of special importance to people moving around and that are repeatedly standing up, walking, sitting down, carrying things etc.

In an alternative embodiment, the card holder can be equipped with adhesive tape to fit to the inside of a vehicle's window, thus making it possible either to continuously let the card follow the vehicle e g for payment of road tolls, or to have it temporarily fitted in the holder when driving, e g for access to a car park, and then bringing it along with the driver when leaving the vehicle, e g to get access to a building. A slot is formed between the vehicle's window and the holder, thus making it simple to insert or take out the card from the holder.

To also fit into already existing installations using magnetic cards, e g access control systems or payment automates, it is suitable to integrate a magnetic strip along either side of the transponder card.

The card can also be used to pay at the fuel pump according to patent application SE 9203590-6, of special interest in automatic fuelling systems where leaving the car during the filling process is unnecessary. Thus, in addition to the increased convenience, an increased safety against robbery is achieved while the car doors can remain locked and the windows closed throughout the fuelling process.

Furthermore the card can be used to get access to a vehicle and to set driving parameters such as seat and rear view mirror adjustments, as described in patent application SE 9201475-2.

In some applications it may be suitable to be able to communicate more than one card in the same communication zone. This can be achieved by using a random time data transfer from the card, e g as described in patent application SE 9201864-7. This is especially beneficial in people tracking applications, where a number of people enters or exits a door or gate together but nevertheless have to be securely identified.

Another application demanding simultaneous communication with more than one transponder in the communication zone is multiple lane toll roads, where one or several interrogator antennas above the road with free flowing Traffic are to communicate every passing vehicle transponder.

A technology used for simultaneous identifying of several persons, e g in a door or walking gate, can be that the microwave modulator of the card is repeatedly fed with an individual code from its memory but where every code is time limited and is given from the card to the interrogator with different time intervals in a random, or pseudo random manner, and that are given completely independent in time from any signals that are sent from the interrogator.

To power the electronic circuits in the card, i e for operating the low frequency built in clocking oscillator, either a battery, a coil or at least one microwave diode can be integrated along with the aforementioned antenna unit.

In case of battery powering, the battery can preferably be of a so called paper thin type, located beside the antenna device. Battery powering has the advantage of simplicity on the communicator side and possibility to use RAM or shift registers in the card for the writeable part of it's memory. Quicker reading is possible since the card's electronics circuits can be active all the time and need no power up time. Normally also a comparatively longer communication range than with the other methods is possible, since no energy has to be transferred for powering of the card, only for transferring of information.

If the battery's, or any other component's thickness, is not in compliance with what is needed to make the card in ISO thickness, i e 0.76 mm, for instance if a button cell is used, the card can be made in ISO thickness only along the side carrying the magnetic track to permit usage of the card in magnetic swipe readers. These accept magnetic strip cards as long as they are according to ISO along the strip itself.

In case of coil powering, the coil can preferably be in the form of a number of turns around the antenna device. Coil powering has the advantage of eliminating the cost for the battery, but eliminates the possibility to use RAM or shift registers for the memory. In comparison with conventional inductive cards that use a coil both for transferring information and energy, a device that uses microwaves for the transfer of information and inductive technology for the powering will obtain a considerable longer communication range than a purely inductive card. This is because the maximum range in a pure inductive system is usually limited in the interrogator's reception channel due to low signal to noise ratio in the received card signal.

Interference problems are especially pronounced in an electrically noisy environment (interference from car ignition systems, vehicle loop detectors, burglar alarms, asynchronous motors, illumination systems etc.), where undesired interfering frequencies suitable for inductive transfer, typically in the order of 130 kHz, easily disturb the communication. Microwave technology, operating in a completely different band, will not be impeded by such interference and will thus give a comparatively longer range than pure inductive systems.

In case of microwave powering using at least one microwave diode for the feeding of microwave power to the card, no windings are needed at the communicator to generate the powering field, nor in the card to pick up the field. In many respects, the characteristics will be similar to that of the earlier described inductive powered microwave card. The cost will however be the lowest of the described alternatives.

To further simplify the use of a microwave card according to the invention, it can be circular polarised according to any of the known methods for this. A card with a circular polarised patch antenna can, different from a single dipole antenna card that cannot be circular polarised, be oriented in any arbitrary rotational angle along the radiation axis of the interrogator's antenna whether this is circular or linear polarised, thus furthermore reducing the need of user education.

One known method to obtain circular polarisation in a patch antenna is to use a phase shifter/hybrid in the card and to feed a square patch antenna at two orthogonal sides, thereby creating two E-vector radiations that are 90 degrees out of polarisation and 90 degrees out of phase as is the definition of circular polarisation. This method gives a wide band solution.

Another known method is to make the patch unsymmetrical such that two closely spaced resonant frequencies around the operating frequency of the interrogator's frequency are obtained. If for instance a slightly rectangular patch antenna is used, and this is fed at a corner, it will radiate in two orthogonal directions but at 90 degrees phase difference due to the detuning effect, thus obtaining circular polarisation. Still components and microstrip conductors can be located in an opening in the patch, that now preferably should be asymmetrical. This method gives a more narrowband solution than using the phase shifter/hybrid.

DESCRIPTION OF THE DRAWINGS

The invention will now be described in more detail with reference to the accompanying figures, of which

DESCRIPTION OF EMBODIMENTS OF THE INVENTION

Figure 1:
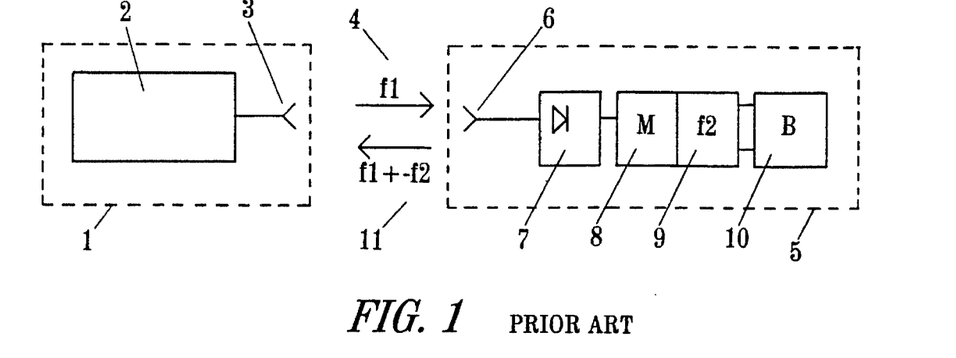
FIG. 1 shows a block diagram of a known device, i e a transponder and an interrogator.

FIG. 1 shows a known microwave transponder system. An interrogator 1 comprises a transmit/receive unit 2 that via an antenna 3 transmits a microwave signal 4 of a first frequency, here designated f1, towards a transponder 5.

The f1 signal is received by the transponder antenna 6 and is fed to a detector/modulator diode 7 that is in connection with a memory 8 in the unit. The transponder also contains a low frequency oscillator 9, powered from a built in battery 10 and operating at a comparatively low frequency e g 32.8 kHz.

When the transponder is to be read, the oscillator clocks the memory data to the modulator diode, thus bringing the diode to switch between two states each with a certain microwave impedance. In case the data is a bit stream without data information, the diode thus repeatedly switches it's microwave impedance 32 800 times per second. A part of the illumination signal f1 is reflected in the diode 7, to be reradiated into space via the transponder's antenna, thereby causing a second microwave signal 11, here called f1+−f2, to reach the interrogator's antenna 3 and the reception circuits of the transmit/receive unit 2.

It can be shown that the reradiated signal has the form of information sidebands on one or both sides of the illumination frequency f1, spaced from f1 with a frequency difference f2.

Now, if the memory 8 contains data to be read, the modulator diode 7 will change it's impedance accordingly so that a wider spectrum of sidebands f1+−f2 will reach the interrogator's transmit/receive unit and be decoded there for further use. The broadening of the spectrum will be related to the data code, the coding method and the data transfer speed according to known algorithms for radio transmission.

If the transponder is to be written, the interrogator transmits a pulsed microwave signal 4, that now is amplitude detected by the modulator/detector diode 7, and transferred into the transponder's memory 8 as a pulse train coded with write data. In writing data to the transponder, it is essential that data to the transponder is transmitted in synchronism with the transponder's internal clock oscillator 9 to be correctly clocked into the memory 8. This synchronism can be obtained by the interrogator first reading a synchronisation signal from the transponder before attempting to write data to it.

The memory can be in the form of a RAM or a shift register in case the transponder is battery powered, or an EEPROM in case the transponder is powered by electromagnetic energy e g via an inductive coil or via the microwaves themselves. If partly or in whole being a read only memory, the memory 8 can, be hard coded by laser engraving directly onto the memory chip. Also fusible links can be used for this purpose, as can ordinary EEPROM or EPROM technique.

The modulator/detector diode 7 can be two separate components, or, as in another embodiment of the invention, a common component that alternately is used for detection and for modulation. It can also be realised entirely or partly with transistors, preferably of the FET type.

The modulator/detector diode does not necessarily have to be a separate component, but can instead be integrated onto the same silicon chip as the oscillator, memory and oscillator, to save cost and space.

The transponder typically contains no microwave oscillator or amplifier that adds energy to the incoming signal 4 before it is reradiated as signal 11, and thus consumes only the power necessary to operate the oscillator 9, to clock the memory circuits 8 and to change the impedance of the detector/modulator diode.

The transponder also contains a pseudo random generator that is not shown in the figure. It consists of a shift register that is clocked from the oscillator and that is recursively connected to generate a random timing sequence for clocking of the memory. Thus the memory contents are fed to the modulator/detector diode with random intervals, between which the transponder is in idling state. It is thus possible for an interrogator to simultaneously communicate more than one transponder, as long as collision between different transponder signals can be resolved. This can for instance be done by using checksums in the transponder data according to known methods.

The card thus repeatedly modulates the second microwave signal with a code from it's memory, where every code is time limited and is given from the card with random or pseudo random time intervals that are time independent of all signals from the interrogator.

Figure 2A:
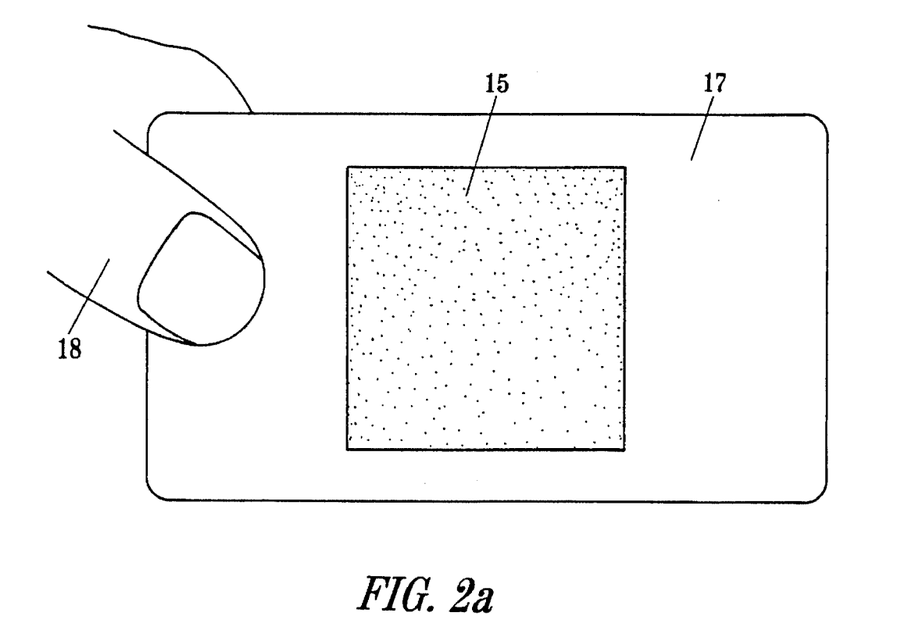
FIG. 2a and 2b show a credit card transponder according to the invention.
Figure 2B:
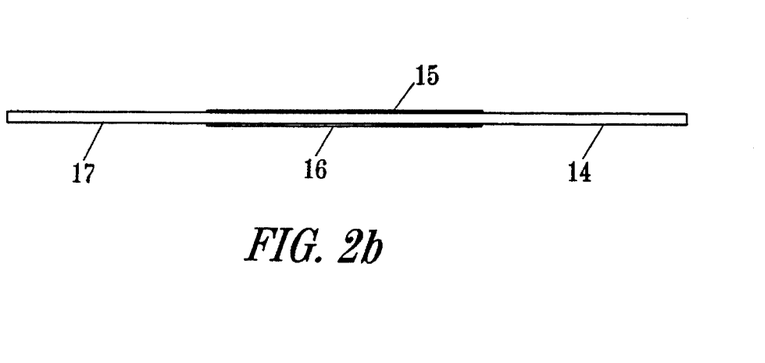

In FIG. 2, a card 14 is shown, where the antenna comprises a patch antenna surface 15 and a ground plane surface 16 of principally equal size as the antenna surface. A dielectric material 17 is arranged between the patch and the ground plane, that in the shown example also is the carrier substrate of the card. Not shown in FIG. 2 are the earlier mentioned electronics and the battery.

If the dielectric constant is low, such as in a thermoplastic material, the size of the antenna 15 at a given frequency will be comparatively large thus making the antenna efficient and giving the transponder a long communication range from the interrogator. A suitable value for the dielectric constant is 5 or lower if operating at 2.45 or 5.8 GHz.

With a higher dielectric constant, e g in the order of 10 such as in ceramics and some thermoset resins, an antenna can be designed for use in an ISO sized credit card transponder operating in such low microwave frequency as the ISM band at 915 MHz, provided an antenna arrangement with similar size on the ground plane and of the antenna surface is used. It should be noted that the relevant antenna size is defined along the E-vector of the resonant antenna patch, that then preferably should be chosen with the resonant dimension along the longer side of the card.

The shown example has a close to correct scale, provided the unit is made for operation in the 2.45 GHz band and that a dielectric constant of around 4 is used. As can be seen, plenty of space exists around the card edges for a user's hand 18 to grip the card without unintentionally covering the microwave antenna with the fingers.

Figure 3:
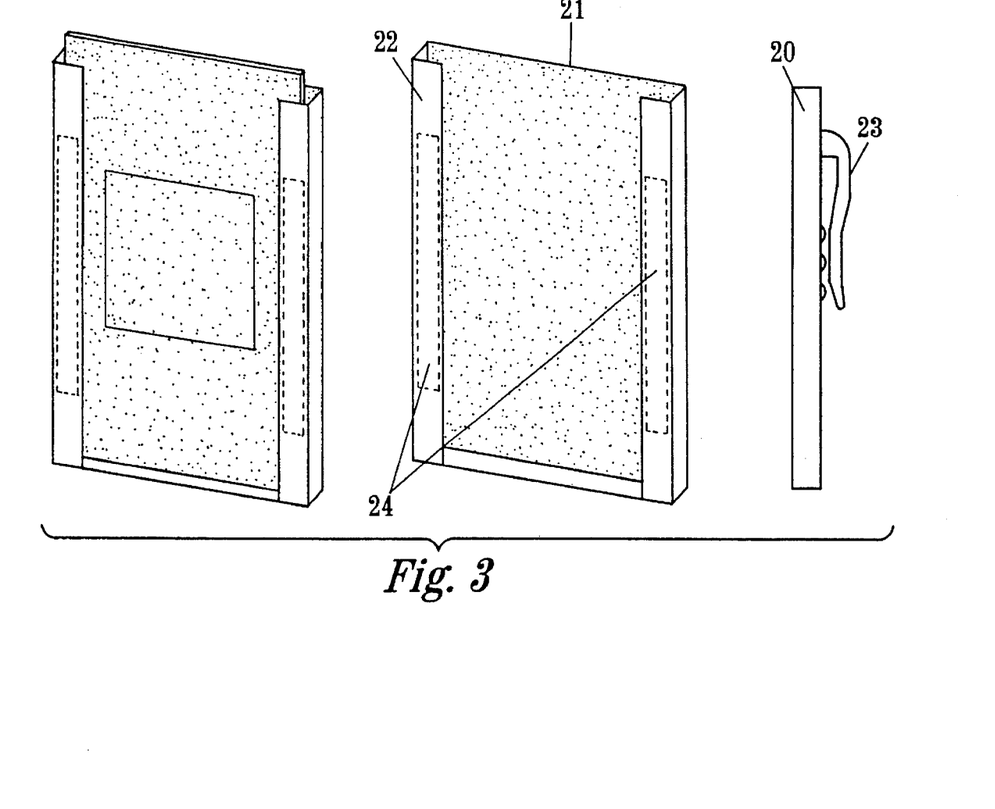
FIG. 3 shows a view of a holder for the credit card transponder.

FIG. 3 shows a card holder 20, that has a reflective surface 21 for the reflection of card signals as earlier described. A flange 22 holds the card in position, and a clip 23 is used for fixing the card holder to a user's clothing.

In case the holder is to be mounted on the inside of a car window, an adhesive tape 24 is used to fix the holder to the window. A slot will thus be obtained between the window and the reflecting surface to securely keep the card in position. No clip is of course necessary when mounted in a car window.

Figure 4A:
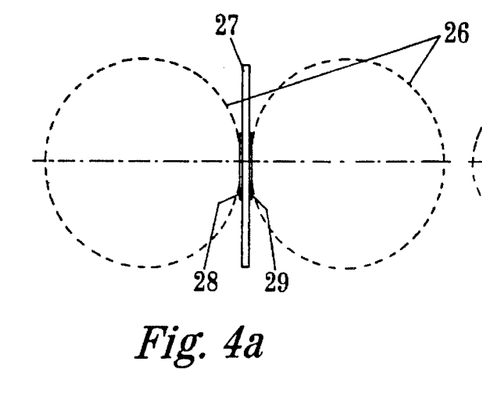
FIGS. 4a and 4b shows antenna diagrams of the transponder in free space and when mounted in a holder according to the invention.
Figure 4B:
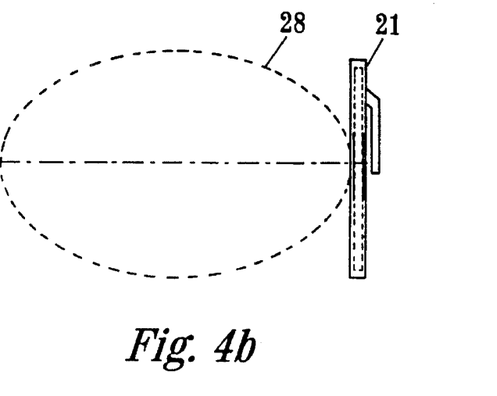

FIG. 4a shows the antenna diagram 26 of a transponder 27 with a patch antenna in free space, where the antenna surface 28 and the ground plane 29 have principally equal surface, while FIG. 4b shows the antenna diagram 28 of the same transponder 27 when it is mounted in a card holder.

Since all energy is reflected in the reflecting surface 21 in a phase that is the same as the directly radiated wave, the volume of the lobe described by the antenna diagram 28 is principally the same as the sum of the two lobes 26, thereby considerably increasing the useful range of the transponder.

Figure 5A:
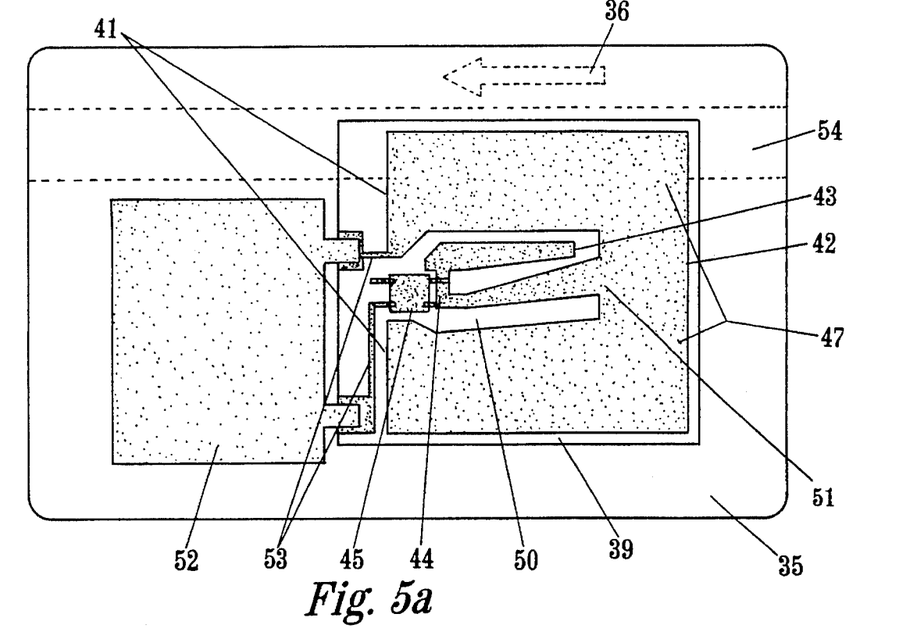
FIG. 5a, 5b and 5c show in detail a preferred embodiment of the credit card transponder according to the invention.
Figure 5B:
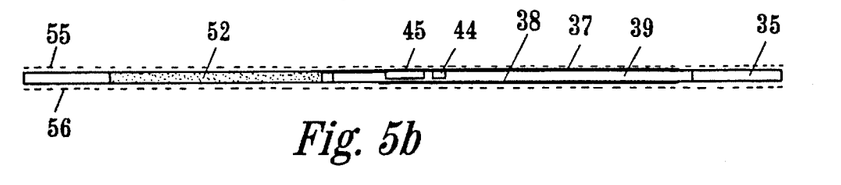
Figure 5C:
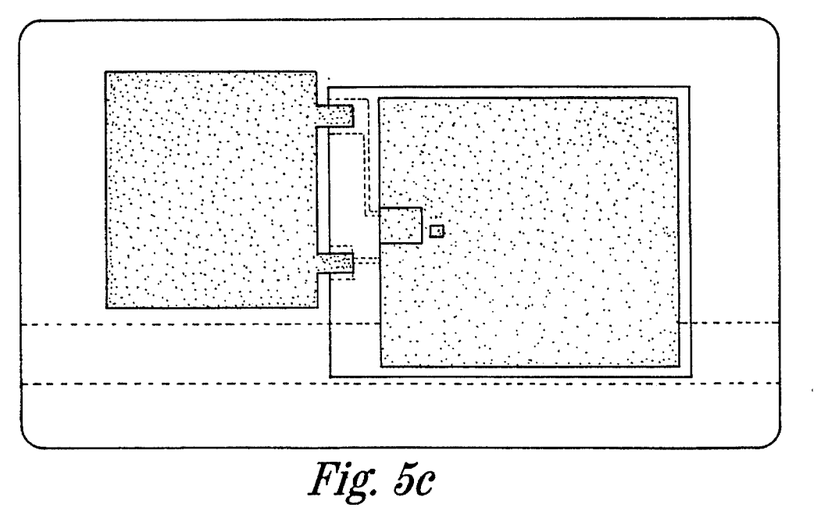

FIG. 5 shows a transponder 35 according to the invention more in detail.

The polarisation plane of the E-vector is assumed to be as shown with the arrow 36. The patch antenna layer 37 and the ground plane 38 are separated by a low loss dielectric material 39, that is inserted close to the centre of the card.

The patch antenna radiates at the edges 41 and 47 where the electrical field strength between antenna layer and ground plane is as highest. The antenna can be fed in different ways, but shown in FIG. 5 is a preferred embodiment, where microstrip conductors 42, 43 and electronic components 44, 45 are located in an opening 50 in the antenna surface.

Since hardly no microwave current lines are broken by the opening in the antenna surface, it has only a minor effect on the antenna characteristics. The embodiment with said opening is however essential to save space and minimise use of the relatively expensive low loss microwave dielectric material 39. The microstrip conductors operate towards the same ground plane 38 as the antenna, and thus no feed through holes are needed in the dielectric material.

The antenna feeding point 51 has been selected to match the impedance of the tapered (thicker at one end and thinner at the other) signal transmission line 42, that connects the patch antenna to the modulation/detection diode 44.

A quarter wave short circuit line 43 grounds the other end of the microwave diode so that it's impedance, as seen from the antenna, will vary to it's full extent to provide an efficient modulation with coded data that originates from the memory of an application specific integrated circuit (ASIC) 45.

The earlier mentioned oscillator in the ASIC receives it's voltage from a paper thin battery 52 via the patch antenna and the microstrip connector 42. In order to avoid any disturbance of the microwave functions of the antenna patch by the battery, the connectors to the battery 53 are made as thin as possible to provide a high impedance for microwave frequencies.

The ASIC's output switches the diode between a reverse voltage and zero bias according to the modulation data codes, thereby changing the impedance that the diode connects between the antenna feed 42 and the short circuit conductor 43 so that the earlier mentioned reradiation of information sidebands can take place.

When writing data to the card, the diode is used as a detector with a forward or zero bias to present voltage pulses at the ASIC terminal in accordance with the illuminating microwave pulses that are picked up by the antenna, thereby providing information to write into the memory of the ASIC.

The described assembly is covered by microwave transparent protection foils 55, 56, and to make the card compatible with magnetic cards according to ISO, a magnetic strip 54 is attached to the card's surface. The total thickness of the card is 0.76 mm according to the ISO standard for magnetic cards, at least along the edge where the magnetic strip is assembled.

The transponder can be given a directed diagram also without using a reflective holder.

This can either be done by letting the foil 56 that is fitted on the ground plane side have a reflective material, and thus the desired directivity is obtained without using more of the expensive microwave substrate material than necessary.

Since no metallic contact is needed between the reflective material and the ground plane, a reflective foil can also be fitted after manufacture to customise the transponder with a directive lobe. It can then for instance have the form of an adhesive metallic tape that is put onto the card.

Figure 6:
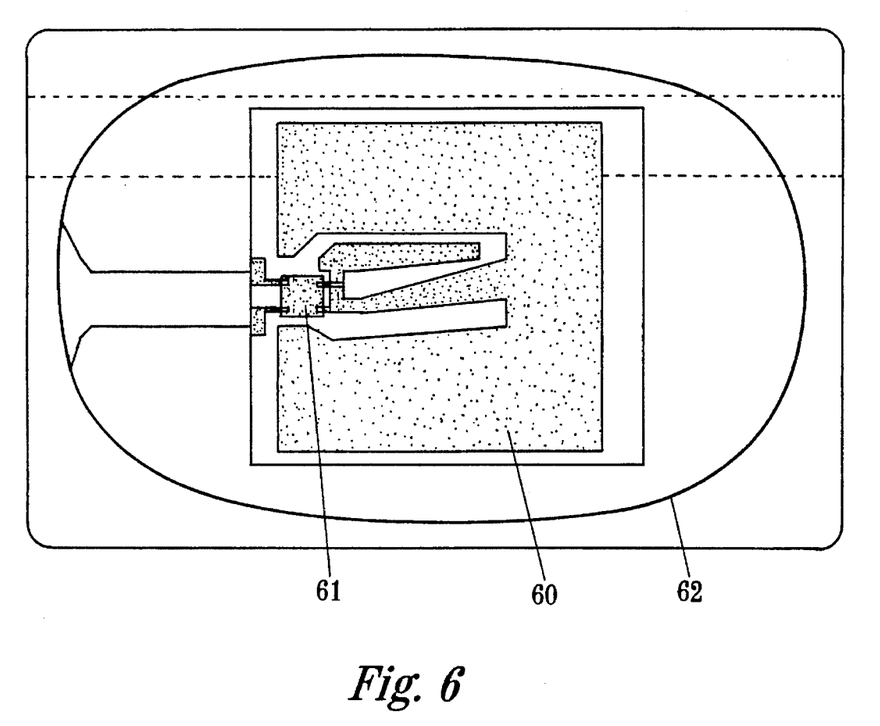
FIG. 6 shows a credit card transponder that is inductively powered via a coil in the card.

FIG. 6 shows an inductive powered microwave transponder card, where a microwave antenna assembly 60 is connected to an ASIC 61 that is powered via a multiturn coil 62. In this embodiment, rectification and stabilisation circuits are included in the ASIC in addition to the earlier mentioned functional blocks such as low frequency oscillator, memory and possibly an integrated modulator/detector diode.

Figures 7A, 7B:
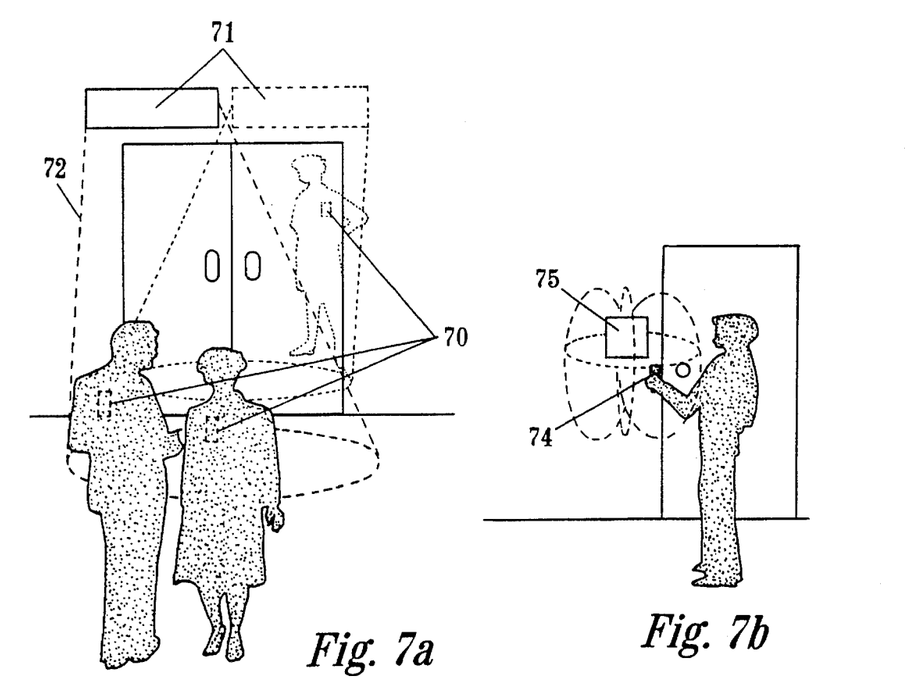
FIGS. 7a, 7b and 7c show views of different methods to use the invention.
Figure 7C:
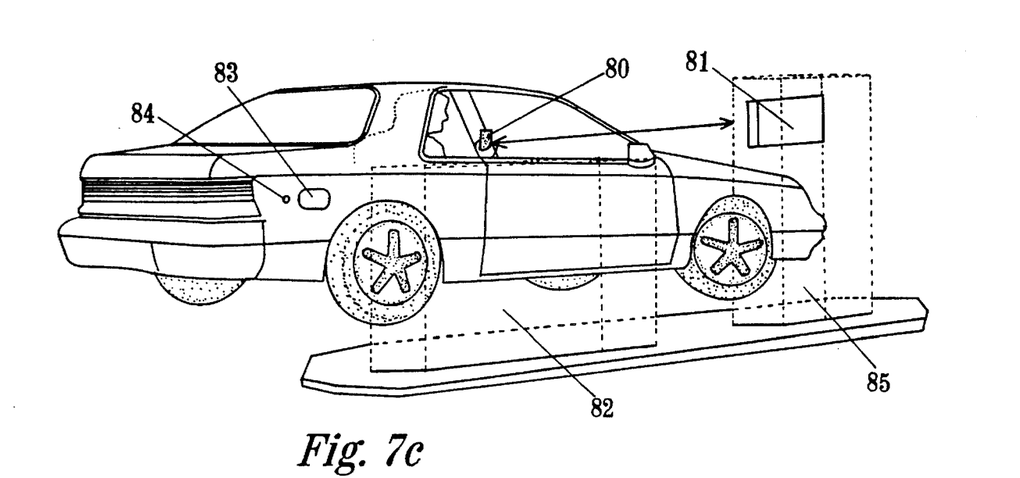

FIGS. 7a to 7c show different methods to use the invention.

The FIGS. 7a and 7b show methods for giving access to and/or record the movement of people using a card according to the invention for access, passage recording and or debiting. They show the situation at the entrance or exit through a door or a walking gate.

In a similar manner control of the entry to an automobile can be imagined, e g if the interrogator antenna is placed in the vehicle's side mirror, or alternatively in the main mirror or dashboard thus illuminating the transponder through the side window.

Furthermore the figures show a method for giving access or debiting of fees related to a vehicle, using a card according to the invention. The method includes a transaction related to the debiting, access and/or recording. Transactions can be made without the card leaving the inside of the vehicle or being stretched out through the side window. Shown in FIG. 7c is debiting in relation to automatic fuelling, but typical transactions also include debiting/access at parking lots, automatic road toll stations and elsewhere.

In FIG. 7a, persons at the door are carrying transponders 70 that are communicated from interrogator antennas 71 located above the door. The dotted line 72 indicates the communication zone, and, as can be understood from the figure, it is of great advantage that the system is able to simultaneously communicate several transponders in the same communication zone.

FIG. 7b shows a simple communication point at a door where the communication range has been chosen to be comparatively short. In this case, convenience is considerably increased if the transponder 74 can be communicated from either side, and preferably also no matter of how the transponder is rotationally oriented along the radiation axis of the interrogator antenna 75. This latter problem is, as before described, solved using circular polarisation.

In addition to door applications, people access, recording and/or debiting can be done in walking gates such as in entrances to subway stations, train stations etc.

FIG. 7c shows communication from the inside of a vehicle, where a debiting automate 85 is equipped with an interrogator antenna 81 to communicate a transponder 80 in a vehicle.

The figure relates to debiting in relation to automatic fuelling, where a fuelling robot 82 senses the position of the filling point 83 by means of a positioning device 84, that can be a transponder or an optical label. Positioning can thus be made with microwave as well as other technologies, e g by video technique.

Also in this case it is obvious that the convenience is increased if the transponder 80 can be freely oriented in relation to the interrogator's antenna 81.

Similar debiting automates can be used for many purposes, e g for parking, car wash etc.

The various features and advantages of the invention are thought to be clear from the foregoing description. However, various other features and benefits not specifically enumerated will undoubtedly occur to these versed in the art, as likewise will many variations and modifications of the preferred embodiments illustrated, all of which may be achieved without departing from the spirit and scope of the invention as defined by the following claims.

I claim:

1. A device for wireless transfer of information, comprising a data carrier in the form of a thin card transponder, that receives a first microwave signal, modulates it and codes it with data, and reradiates a second microwave signal without adding new energy thereto, including at least one antenna device formed using microstrip conductors, the antenna device comprising a patch antenna with an antenna layer (15, 28, 37) that acts against a ground plane (16, 29, 38) where the antenna layer and the ground plane are of substantially equal size, characterized in that, the device is equipped with a separate card holder (20) with a reflective surface (21) that is larger than said ground plane, said reflective surface increasing the range by reradiating the second microwave signal and reducing sensitivity to back lobe reflections.

2. Device according to claim 1, characterized in that, a magnetic strip (54) is arranged along the card and that the card is made in ISO thickness along this magnetic strip, i.e. typically 0.76 mm and maximum 0.84 mm, but that the card has a higher thickness elsewhere to make room for internal parts of the card.

3. Device according to claim 1, characterized in that, the card holder is designed to be attached to the inside of a vehicles's window and/or that the card is insertable to and removable from the slot that is formed between the holder's reflective surface and the window.

4. Device according to claim 1, characterized in that, the card repeatedly modulates the second microwave signal with a code from it's memory, where every code is time limited with random or pseudo random time intervals.

5. Device according to claim 1, characterized in that, a common modulation/detection diode (7) is used for detection and for modulation.

6. Device according to claim 1, characterized in that, a modulation/detection diode (44) is integrated onto the same substrate as an application specific integrated circuit (ASIC), (45), to form one single component that is used both for microwave and for low frequency functions.

7. Device according to claim 1, characterized in that, said card holder is in a shape of a rectangular compartment, and said thin card transponder is disposed within said card holder.

8. Device according to claim 1, characterized in that, said microstrip conductors are located within an inner circumference of an antenna surface of said antenna device, and said microstrip conductors and said antenna surface acting against a same area of said ground plane.

9. Device according to claim 1, characterized in that, said reflective surface is wider than the surface of said antenna device and said ground plane along the polarization E-plane.

10. Device according to claim 1, characterized in that, said microstrip conductors are circularly polarized permitting said thin card to be oriented according to an arbitrary rotational angle of said thin card.

11. Device according to claim 1, characterized in that, said patch antenna and said reflective surface reflects components of the second microwave signal in phase increasing the distance the second microwave signal is propagated from said antenna device.

12. A device for wireless transfer of information, comprising a data carrier in the form of a thin card transponder, that receives a first microwave signal, modulates it and codes it with data, and reradiates a second microwave signal without adding new energy thereto, including at least one antenna device formed using microstrip conductors, the antenna device comprises a patch antenna with an antenna layer (15, 28, 37) that acts against a ground plane (16, 29, 38) where the antenna layer and the ground plane are of substantially equal size, characterized in that, the device is equipped with a metallic foil (56) on the ground plane side, that is separate from the ground plane (38) and the metallic foil being larger than said ground plane, said metallic foil increasing the range by reradiating the second microwave signal and reducing sensitivity to back lobe reflections.

13. Device according to claim 12, characterized in that, a magnetic strip (54) is arranged along the card and that the card is made in ISO thickness along this magnetic strip, i.e. typically 0.76 mm and maximum 0.84 mm, but that the card has a higher thickness elsewhere to make room for internal parts of the card.

14. Device according to claim 12, characterized in that, the card repeatedly modulates the second microwave signal with a code from it's memory, where every code is time limited with random or pseudo random time intervals.

15. Device according to claim 12, characterized in that, a common modulation/detection diode (7) is used for detection and for modulation.

16. Device according to claim 12, characterized in that, a modulation/detection diode (44) is integrated onto the same substrate as an application specific integrated circuit (ASIC), (45), to form one single component that is used both for microwave and for low frequency functions.

17. Device according to claim 12, characterized in that, said microstrip conductors are located within an inner circumference of an antenna surface of said antenna device, and said microstrip conductors and said antenna surface acting against a same area of said ground plane.

18. Device according to claim 12, characterized in that, a reflective surface of said metallic foil is wider than the surface of said antenna device and said ground plane along the polarization E-plane.

19. Device according to claim 12, characterized in that, said microstrip conductors are circularly polarized permitting said thin card to be oriented according to an arbitrary rotational angle of said thin card.

20. Device according to claim 12, characterized in that, said patch antenna and said metallic foil reflects components of the second microwave signal in phase increasing the distance the second microwave signal is propagated from said antenna device.

\* \* \* \* \*